United States Patent [19]

Kameda et al.

[11] 3,988,392
[45] Oct. 26, 1976

[54] METHYL METHACRYLATE POLYMER COMPOSITION

[75] Inventors: Nobuo Kameda; Yoshio Nakai; Mitsuru Takahashi, all of Otake, Japan

[73] Assignee: Mitsubishi Rayon Co., Ltd., Tokyo, Japan

[22] Filed: Feb. 10, 1975

[21] Appl. No.: 548,628

Related U.S. Application Data

[63] Continuation-in-part of Ser. No. 340,460, March 12, 1973, abandoned.

[30] Foreign Application Priority Data

June 24, 1972 Japan............................... 47-63519

[52] U.S. Cl.............................. 260/876 R; 260/885
[51] Int. Cl.².................... C08L 51/06; C08L 31/02
[58] Field of Search........................ 260/885, 876 R

[56] References Cited
UNITED STATES PATENTS

| | | | |
|---|---|---|---|
| 3,502,604 | 3/1970 | Nakatsuka et al. | 260/885 |
| 3,632,684 | 1/1972 | Tellier et al. | 260/881 |
| 3,678,133 | 7/1972 | Ryan | 260/876 R |
| 3,681,475 | 8/1972 | Spilner | 260/876 R |
| 3,821,329 | 6/1974 | Gallagher | 260/885 |
| 3,830,878 | 8/1974 | Kato et al. | 260/876 R |

*Primary Examiner*—Murray Tillman
*Assistant Examiner*—Thurman K. Page
*Attorney, Agent, or Firm*—Armstrong, Nikaido & Wegner

[57] ABSTRACT

There is provided a polymer composition consisting essentially of 95–50 wt% of a methyl methacrylate homopolymer or copolymer component and 5–50 wt% of a cross-linked elastomer obtained by copolymerizing a mixture of stated amounts of (I) alkyl acrylate, (II) allyl acrylate and/or allyl methacrylate and (III) benzyl acrylate, the elastomer having a stated average particle size and a stated extent of cross-linking. The polymer composition comprises (1) a graft copolymer obtained by polymerizing methyl methacrylate or its mixture in the presence of the above elastomer; or (2) a blend of the above graft copolymer and a methyl methacrylate homopolymer or copolymer. The polymer composition provides shaped articles exhibiting good transparency over a broad range of temperature as well as good weather resistance and impact resistance.

9 Claims, No Drawings

METHYL METHACRYLATE POLYMER COMPOSITION

This is a continuation-in-part application of application Ser. No. 340,460, filed Mar. 12, 1973, now abandoned.

This invention relates to a thermoplastic polymer composition exhibiting good transparency over a broad range of temperature as well as good weather resistance and impact resistance.

Polymers of methylacrylic acid ester, particularly methyl methylacrylate, are widely used to manufacture useful articles by, for example, injection molding or extrusion process because the articles present a very attractive appearance and an excellent weather resistance. These articles are, however, inferior in mechanical properties sucgh as impact resistance, and do not stand rough usage. In order to improve the impact resistance, various proposals have been heretofore put forward wherein an elastomer is incorporated into the methyl methacrylate polymer. However, the resulting article, has in general such serious defect as being inferior in both or either appearance or weather resistance.

For example, Japanese Patent Publication No. 26111/1970, discloses a method wherein methyl methacrylate is polymerized in the presence of a small amount of a butadiene (45–55% by weight)-butyl acrylate copolymer. The resulting polymer composition possesses relatively excellent transparency and impact resistance. However, articles made therefrom have such serious defects as the phenomenon of surface crazing readily appears and the articles become dim, particularly when exposed outdoor. The impact resistance is also lowered with the passage of time. Further, when powders of the polymer composition are extruded to form pellets and the pellets are molded into a shaped article, the polymer composition is subjected to thermal and oxidative deterioration on exposure to heat, and consequently, produces stains on the extruder and the molding machine. These stains also cause stains on the shaped article and thereby deal a fatal blow to such articles, particularly those which are transparent.

Japanese Patent Publications 11288/1963 and 11069/1964, disclose a method of producing a graft polymer composition wherein methyl methylacrylate or a monomer mixture of methyl methacrylate and other copolymerizable monomer is polymerized in the presence of an elastomer obtained by polymerizing a lower alkyl acrylate or a monomer mixture of a lower alkyl acrylate and other copolymerizable monomer. The polymer composition results in shaped articles possessing good stability to heat and outdoor exposure as well as excellent impact resistance. The good stability to heat and outdoor exposure seems to be due to the fact that the elastomer component contains no diene. The shaped articles are, however, inferior in transparency and surface luster.

U.S. Pat. No. 3,808,180 discloses methyl methacrylate composite interpolymers comprising an elastomeric phase and a rigid thermoplastic phase polymerized in the presence of the elastomeric phase. Shaped articles from this composite interpolymers possess good transparency, weather resistance and impact resistance. However, they are liable to become poor in transparency with an increase or decrease of the temperature although they exhibit good transparency at normal temperature. This restricts the use of the shaped articles, particularly in cold areas.

It is an object of this invention to provide a methyl methacrylate polymer composition which results in shaped articles exhibiting good transparency over a broad range of temperature as well as good weather resistance and impact resistance, and produce no stains on the shaped articles at the time of shaping.

According to the present invention, there is provided a polymer composition consisting essentially, by weight, of:

A. 95 to 50% of a polymer consisting essentially, by weight, of 100 to 80% methyl methacrylate and 0 to 20% of at least one copolymerizable vinyl and/or vinylidene monomer, at least 10 parts by weight of said polymer, based on 100 parts by weight of the crosslinked elastomer in (B) below, being those obtained by polymerization in the presence of the crosslinked elastomer in (B) below; and B. 5 to 50% of a crosslinked elastomer obtained by copolymerizing by aqueous emulsion polymerization a monomer mixture consisting essentially of:
  I. at least one alkyl acrylate containing from 2 to 8 carbon atoms in the alkyl moiety,
  II. allyl acrylate and/or allyl methacrylate, and
  III. benzyl acrylate, said crosslinked elastomer being substantially spherical in shape and having an average particle size of 0.05 to 0.25 micron, a degree of swelling of 3 to 20 and a gel content of not less than 80%, and the amounts of the three components (I), (II) and (III) contained in the crosslinked elastomer (B) being such that component (II) is present in an amount of 0.5 to 5 parts based on 100 parts of component (I) and the ratio of {component (I) + component (II)}/component (III) is from 75/25 to 65/35, all by weight.

In one aspect, the above-defined polymer composition is a graft copolymer composition obtained by polymerizing 100 to 1,900 parts by weight of a monomer mixture consisting essentially, by weight, of 100 to 80% methyl methacrylate and 0 to 20% of at least one copolymerizable vinyl and/or vinylidene monomer, in the presence of 100 parts by weight of the crosslinked elastomer (B) mentioned above.

In another aspect, the above-defined polymer composition is a blend of a polymer (C) consisting essentially, by weight, of 100 to 80% methyl methacrylate and 0 to 20% of at least one copolymerizable vinyl and/or vinylidene monomer with a graft copolymer composition obtained by polymerizing not less than 10 but less than 1,900 parts by weight of a monomer mixture consisting essentially, by weight, of 100 to 80% methyl methacrylate and 0 to 20% of at least one copolymerizable vinyl and/or vinylidene monomer, in the presence of 100 parts by weight of a crosslinked elastomer (B) mentioned above.

By the terms "degree of swelling" and "gel content" used in the specification including claims are meant those which are determined as follows:

A crosslinked elastomer (B) (an air-dried weight of which is referred to as $W_0$) is immersed in an approximately 50-fold amount of toluene in relation to the crosslinked elastomer (B) at a temperature of 30° C. After being left for 48 hours, a weight of the swelled elastomer (referred to as $W_1$) and then, an absolute dry weight thereof (referred to as $W_2$) are measured. Degree of swelling and gel content are calculated from the following equations:

Degree of swelling = $(W_1 - W_0)/W_0$

Gel content, percent = $(W_2/W_0) \times 100$

As is in general known, when polymer particulates are incorporated into another polymer phase, the refractive index of the polymer particulates in relation to visible light needs to be substantially identical with that of the polymer phase in order to result in a transparent polymer phase.

A polymer (C) consisting essentially, by weight, of 100 to 80% methyl methacrylate and 0 to 20% of at least one copolymerizable vinyl and/or vinylidene monomer, which polymer may be blended with the graft copolymer composition to produce the polymer composition of the invention, in general has a refractive index falling within the range of 1.486 to 1.497. Therefore, in order to produce a transparent polymer composition, the refractive index of the crosslinked elastomer (B) needs to fall within the range of 1.486 to 1.497. Thus, it has been found that the amounts of the three components (I), (II) and (III) contained in the crosslinked elastomer (B) should be such that the ratio of {component (I) + component II)}/component (III) is within the range of 75/25 to 65/35.

If a graft copolymer particle containing an elastomer component, to be blended with a methyl methacrylate polymer, is limp, the graft copolymer results in a shaped article possessing a considerably reduced transparency even though a refractive index of the graft copolymer is substantially identical with that of the methyl methacrylate polymer. Because, the graft copolymer particle exhibits a strong tendency to be deformed, disrupted or re-coagulated when the polymer composition is subjected to melt shaping, it consequently results in a shaped article possessing a deteriorated surface luster and a frosted glass-like appearance. Further, the deformation of a graft copolymer particle under a high temperature at the time of melt shaping decreases with an increase of the extent of crosslinking in the elastomer contained in the graft copolymer. It will be understood, therefore, that the crosslinking in the elastomer component is of decided significance in order to obtain a polymer composition resulting in a shaped article of excellent surface luster and transparency.

Thus, it is essential to the invention to employ allyl acrylate and/or allyl methacrylate as a crosslinking agent in an amount of 0.5 to 5 parts by weight based on 100 parts by weight of alkyl acrylate. In some cases, a small amount of organic peroxide may be used as a crosslinking agent in addition to the allyl acrylate and/or allyl methacrylate further to promote the crosslinking, provided that the extent of crosslinking falls within the range such that the degree of swelling of the elastomer is 3 to 20 and the gel content of the elastomer is not less than 80%. In general, organic peroxides, which may be used in addition to allyl acrylate and/or allyl methacrylate include for example aliphatic hyperoxides such as those enumerated hereinafter. Among organic poroxides, aromatic peroxides such as benzoyl peroxide are not preferred because these bring undesirable color formation in the resulting shaped article, although these have a strong activity as a crosslinking agent.

The crosslinked elastomer (B), which is used for the preparation of a graft copolymer in the invention, should have the extent of crosslinking such that the degree of swelling is 3 to 20 and the gel content is not less than 80%. When the extent of crosslinking is excessively low, i.e. the gel content is less than 80% and/or the degree of swelling exceeds 20, the elastomer particles coheres with each other and are deformed into a slender shape extending in the direction of flow of the polymer resin when the polymer composition is subjected to melt shaping, and consequently, reduce the surface luster and the transparency of the shaped article. In contrast, when the extent of crosslinking is excessively high, i.e. the degree of swelling is less than 3, the resulting shaped article possesses excellent surface luster and transparency but deteriorated impact resistance.

It is widely known that, when particles of a certain material are incorporated and dispersed into a single continuous phase of a different material, the smaller the particle size, the greater luminous transmittance the resulting composition exhibits, provided that the particles adhere closely to the different material at the interface thereof. It is to be understood, however, that, in the case where elastomer particles are dispersed into a single phase of a polymer resin as performed in the present invention, elastomer particles of an excessively small size result in a shaped article possessing a poor impact resistance in spite of excellent transparency. In contrast, elastomer particles of an excessively large size result in the deterioration of transparency in spite of the improvement in the impact resistance. Therefore, in order to obtain a polymer composition of well-balanced transparency and impact resistance, the crosslinked elastomer particle should possess an average particle size falling within the range of 0.05 to 0.25 micron.

It is surprising that the cross-linked elastomer of the present invention provides a polymer composition exhibiting good transparency over a broad range of temperature. Whereas, most transparent methyl methacrylate polymer compositions comprising an elastomeric ingredient are liable to become poor in transparency with an increase or decrease of the temperature although they exhibit good transparency at normal temperature. For example, a polymer comprising an elastomer, which possesses a composition similar to that of the present invention except that it contains units derived from styrene instead of benzyl acrylate, exhibits increased haze both at a low temperature of 5° C or less and a high temperature of approximately 40° C or more, as shown in the working examples below.

The crosslinked elastomer (B) may be prepared in the following manner. Deionized water, an emulsifier and a polymerization initiator are charged into a reactor, followed by the addition of a monomer mixture of the alkyl acrylate, allyl acrylate and/or allyl methacrylate, and benzyl acrylate. Then, the monomer mixture is polymerized at a temperature of 20° to 120° C by emulsion polymerization.

The amount of water used is preferably such that the ratio by weight of the monomer mixture to water is within the range of 1/5 to 1/1.5. As a polymerization initiator, watersoluble inorganic initiators such as, for example, persulfates and perborates are preferably employed either alone, or in combination with reducing compounds such as sulfites, hydrogen-sulfites and thiosulfates, i.e. as a redox initiator system. Also, other redox initiator systems such as, for example, organic hydroperoxide-ferrous salt and organic hydroperoxide-formaldehyde sodium sulfoxylate may be used. As an emulsifier, higher fatty acid alkali salts, alkylbenzenesulfonate, salts of higher alkylsulfuric acid ester such as sodium lauryl sulfate and sodium stearyl sulfate; and salts of dialkylsulfosuccinate such as sodium dioctyl sulfosuccinate may, for example be used. The time period required for the emulsion polymerization is in general from 0.5 to 10 hours, although it varies depending upon the particular polymerization initiator, the amount thereof, the polymerization temperature and other polymerization conditions.

Alkyl acrylates containing from 2 to 8 carbon atoms in the alkyl moiety, which are used for the preparation of the crosslinked elastomer, include preferably ethyl acrylate, butyl acrylate and 2-ethylhexyl acrylate. Of these acrylates, butyl acrylate is most preferable.

A particle size of the crosslinked elastomer (B) in the latex can easily be controlled so as to fall within the range of 0.05 to 0.25 micron by suitably selecting the particular emulsifier and the amount of emulsifier. Also, the particle size greatly varies depending upon the manner wherein a mixture of the partial or total amount of emulsifier to be charged and the partial or total amount of the monomer mixture consisting essentially of the three monomer components (I), (II) and (III) is continuously or intermittently charged into the reactor over a stated period during the polymerization.

As hereinbefore mentioned, the elastomer crosslinked with allyl acrylate and/or allyl methacrylate may further be treated in a latex form with aliphatic peroxide to enhance the extent of crosslinking. The particular aliphatic peroxide and the amount of aliphatic peroxide used may be determined depending upon the temperature at which the crosslinking proceeds, and the desired degree of swelling and gel content.

The crosslinking with the aliphatic peroxide is preferably performed at a temperature of 60° to 100° C. When the temperature is lower than 60° C, it is difficult to obtain the desired extent of crosslinking within a reasonable period of time. In contrast, when the temperature exceeds 100° C, undesirable side reactions such as hydrolysis or the like of the crosslinked elastomer are liable to occur.

The manner whereby aliphatic peroxide is added is not critical. Aliphatic peroxide may be added alone in the form of solid powder or liquid to the latex after the completion of polymerization. For optimum results, aliphatic peroxide is added to the latex as a solution in a monomer mixture consisting of the monomer components selected from the above-mentioned (I), (II) and (III). In the latter case, the amount of the monomer mixture used is in general determined such that the concentration of aliphatic peroxide in the monomer mixture is preferably from 1 to 20%, more preferably from 5 to 10%, by weight. The amount of aliphatic peroxide is in general 0.1 to 5% by weight based on the weight of the crosslinked elastomer (B).

Preferable aliphatic peroxides used as a crosslinking agent are those which exhibit a half life of 0.3 to 10 hours at temperatures of 60° to 100° C. Such aliphatic peroxides include, for example, diisopropyl peroxydicarbonate, di-2-ethylhexyl peroxydicarbonate, ti-butyl peroxypivalate, 3,5,5-trimethylhexanoyl peroxide, octanoyl peroxide, decanoyl peroxide, lauroyl peroxide, propionyl peroxide, acetyl peroxide, t-butyl peroxy-2-ethylhexanoate, t-butyl peroxyisobutyrate, t-butyl peroxylaurate, cyclohexanone peroxide, t-butyl peroxyisopropylcarbonate, t-butyl peroxyacetate and the like.

A graft copolymer composition of the invention may be prepared by polymerizing methyl methacrylate or a monomer mixture consisting essentially, by weight, of not less than 80% of methyl methacrylate and not greater than 20% of at least one copolymerizable vinyl and/or vinylidene monomer in the presence of a latex of the crosslinked elastomer (B). Before commencement of the graft copolymerization, a polymerization initiator and a chain transfer agent and, if desired, additional water are added to the mixture of monomer and elastomer latex. The graft copolymerization is usually performed at a temperature of 50° to 100° C.

The vinyl and/or vinylidene monomer copolymerizable with methyl methacrylate include, for example, acrylic acid esters and vinyl esters. Particularly, methyl acrylate, ethyl acrylate and butyl acrylate are preferable.

The amount of the monomer used for graft copolymerization onto the crosslinked elastomer (B) is from 10 to 1,900 parts by weight based on 100 parts by weight of the crosslinked elastomer (B). When the amount of the monomer is less than the lower limit, it is difficult to obtain a graft copolymer with an appreciable extend of graft copolymerization, and consequently, adherence at the interface between the graft copolymer particles and a methyl methacrylate polymer resin (C) is insufficient even though the graft copolymer is kneaded in a molten state with a methyl methacrylate polymer (C). Therefore, it is impossible to produce a shaped article excellent in both transparency and impact resistance. In contrast, when the amount of the monomer exceeds the upper limit, the resulting graft copolymer usually results in a shaped article excellent in transparency but inferior in impact resistance when the graft copolymer is used both alone and as a blend with a methyl methacrylate polymer (C).

When the amount of the monomer used for graft copolymerization is not less than 10 but less than 100 parts by weight based on the weight of the crosslinked elastomer (B), the resulting graft copolymer results in a shaped article of deteriorated mechanical properties in the case where it is used alone. However, in the case where the graft copolymer is blended with the methyl methacrylate polymer (C) mentioned above in such a proportion that the resulting polymer composition contains 5 to 50% by weight of the crosslinked elastomer (B), the polymer composition results in a shaped article excellent in transparency and impact resistance as well as mechanical properties.

In contrast, when the amount of the monomer used for graft copolymerization is 100 to 1,900 parts by weight based on the weight of the crosslinked elastomer (B), the resulting graft copolymer results in a shaped article excellent in transparency and impact resistance as well as mechanical properties in the case where the graft copolymer is used either alone or as a blend with the methyl methacrylate polymer (C).

At the commencement of the graft copolymerization, it is not preferred to incorporate an additional emulsifier, in order to avoid the creation of new polymer particles, i.e. those of a polymer containing no elastomer.

However, an additional polymerization initiator may be incorporated. A preferable polymerization initiator is selected from those which are soluble in the monomer. For optimum results, a redox initiator system consisting of a peroxide and a water-soluble reducing agent is used. Such redox initiator systems include, for example, a combination of an organic hydroperoxide such as cumene hydroperoxide, t-butyl hydroperoxide, p-menthane hydroperoxide, diisopropyl-benzene hydroperoxide, with a water-soluble reducing agent such as formaldehyde sodium sulfoxylate and sodium metabisulfite. Also, these include a combination of t-butyl peracetate with sodium dithionate.

Chain transfer agents, which are used for controlling the degree of polymerization in the graft copolymerization, include, for example, alkyl mercaptans having from 2 to 18 carbon atoms in the alkyl moiety, thioglycollic acid, and its esters, β-mercaptopropionic acid and its esters, benzyl mercaptan, thiphenol, thiocresol, thionapthol and the like. Of these, alkyl mercaptans having from 4 to 12 carbon atoms in the alkyl moiety is most preferable.

After the completion of graft copolymerization, the graft copolymer is recovered by conventional procedures such as coagulation with salt, filtration, washing, drying and the like. The graft copolymer, thus recovered, is in general in the form of a white powder.

The graft copolymer may be used either alone or as a blend thereof with a methyl methacrylate polymer (C) for the manufacture of shaped articles. The methyl methacrylate polymer (C) means both a methyl methacrylate homopolymer and a copolymer consisting essentially, by weight, of not less than 80% of methyl methacrylate and not greater than 20% of at least one copolymerizable vinyl and/or vinylidene monomer. The copolymerizable vinyl and/or vinylidene monomer may be chosen from those which are hereinbefore mentioned with respect to the graft copolymerization. The methyl methacrylate polymer (C) may be prepared in a conventional manner.

The graft copolymer composition containing the cross-linked elastomer (B), and the methyl methacrylate polymer (C) are uniformly blended with each other in the stated proportion mentioned hereinbefore. At blending, suitable additives such as stabilizer, lubricant, plasticizer, dye, pigment, filler and the like may be added, if desired. The blend is usually kneaded in a molten state at a temperature of 160° to 280° C by a kneading means such as, for example, a Bumbury's mixer, a plastograph, a mixing roll or a screw-type extruder.

It is essential that the final polymer composition consists essentially, by weight, of (A) 95 to 50% of a methyl methacrylate polymer and (B) 5 to 50% of the crosslinked elastomer. When the content of the crosslinked elastomer (B) is lower than 5% by weight, the impact resistance is not significantly improved. In contrast, when the content of the crosslinked elastomer (B) exceeds 50% by weight, the resulting shaped article is considerably inferior in the mechanical properties to that of a conventional methyl methacrylate polymer resin.

Therefore, when the graft copolymer contains the two components of the methyl methacrylate polymer and the cross-linked elastomer (B) in a proportion falling within the above ranges, the graft copolymer is shaped alone into articles. On the other hand, when the graft copolymer contains the two components in a proportion not falling within the above range, the graft copolymer is blended with a methyl methacrylate polymer(C) in an amount such that the resulting polymer blend contains the two components in a proportion falling within the above range, and then, the polymer blend is shaped into articles.

The polymer composition of the invention is used in the form of pellets, powder or the like to manufacture useful shaped articles such as film, sheet, plate and other various molded articles by, for example, injection molding or extrusion processes. In the manufacture of film, a melt extrusion process such as T-die process and inflation process, and a calendering process may be employed. The melt extrusion is preferably performed at a temperature of 180° to 260° C.

The film and other shaped articles are excellent in transparency, surface luster, weather resistance as well as impact resistance. The film or sheet may be, in one use, adhered or laminated onto a steel plate, a polymer sheet, wood and the like in order to impart weather resistance and a decorative effect to these articles.

The invention will be further illustrated with reference to Examples and Comparative Examples, in which "parts" and "%" are both "by weight".

Example 1

| Stage A: Preparation of crosslinked elastomer (E-1) | |
|---|---|
| | Parts |
| n-Butyl acrylate | 73 |
| Benzyl acrylate | 26 |
| Allyl methacrylate | 1.0 |
| Emulsifier (AEROSOL-OT)* | 2.0 |
| Deionized water | 300 |
| Potassium persulfate | 0.3 |
| Disodium hydrogenphosphate (Na$_2$HPO$_4$·12H$_2$O) | 0.5 |
| Sodium dihydrogenphosphate (Na$_2$PO$_4$·2H$_2$O) | 0.3 |

Note: *Sodium dioctylsulfosuccinate, made by American Cyanamid Corporation.

After the above composition was charged into a reactor and flushed with nitrogen, the mixture was stirred at a temperature of 50° C for 4 hours thereby to obtain a latex of an elastomer (E-1) with a conversion of 99.2%. A part of the resultant latex was coagulated by incorporating the latex into an approximately three-fold amount of a 5% aqueous solution of sodium chloride thereby to produce a polymer having a degree of swelling 8.8 and a gel content of 93.3%. When the above latex was diluted with a suitable amount of water to prepare a polymer latex having a concentration of 0.5 g/l, the resultant polymer latex exhibited an absorbance of 0.09 at a wave length of 700 m micron. It was found from a curve showing the interrelation between absorbance and average particle size that the polymer possessed an average particle size of 0.11 micron.

| Stage B: Preparation of graft copolymer (G-1) | |
|---|---|
| | Parts |
| Elastomer (E-1) latex | 400 |
| (Dried polymer content: 25) | |
| Methyl methacrylate | 25.0 |
| n-octyl mercaptan | 0.025 |
| p-menthanehydroperoxide | 0.125 |
| RONGALIT* | 0.125 |
| Deionized water | 1.0 |

Note: *Formaldehyde sodium sulfoxylate.

In accordance with the above formulation, a graft copolymer was prepared. First, after the elastomer (E-1) latex was charged into a reactor and then, flushed with nitrogen while being stirred, the elastomer latex was heated to a temperature of 80° C followed by the addition of an aqueous solution of RONGALIT in deionized water. Then, a mixture of methyl methacrylate, n-octyl mercaptan and p-menthane hydroperoxide was continuously added into the reactor over a period of 30 minutes. After the completion of the addition, the reaction mixture was stirred for 30 minutes further to proceed the polymerization. A part of the resultant latex was taken out for determining the quantity of the unreacted monomer by using gas chromatographic adsorption analysis, whereby the conversion of methyl methacrylate was found to be 99.1%. 400 parts of the resultant graft copolymer (G-1) latex was continuously poured over a period of five minutes into 600 parts of a 3% aqueous sodium chloride solution of a temperature of 60° C, while being stirred, to coagulated the graft copolymer (G-1) latex. Therefore, the product was maintained at a temperature of 75° to 80° C for 5 minutes. Then, the precipitate was filtered and washed three times with deionized water to obtain a white cake. The cake was dried at a temperature of 70° C for 24 hours to produce a white powder of the graft copolymer (G-1).

A part (2.57 g) of the powder was immersed in an approximately 100-fold amount of methyl ethyl ketone at a temperature of 50° C for 72 hours to extract the soluble ingredient therefrom. Then, the mixture was subjected to centrifugal separation at a rate of 15,000 rpm for 60 minutes thereby to separate the insoluble ingredient. Again, the insoluble ingredient was dispersed in the same quantity of methyl ethyl ketone and maintained at a temperature of 50° C for 72 hours to extract a trace amount of the soluble ingredient therefrom, and then subjected to centrifugal separation. The resultant insoluble ingredient was dried to a constant weight at a temperature of 50° C in a vacuum drier to obtain 2.20 g of the dried product. "Graft proportion" and "grafting efficiency" defined by the following equations were 7.3% and 29.3%, respectively.

Graft proportion, percent
= (weight of monomer grafted onto the crosslinked elastomer/weight of the crosslinked elastomer) × 100

Grafting efficiency, percent
= (weight of monomer grafted onto the crosslinked elastomer/weight of monomer charged for graft copolymerization) × 100

Stage C: Preparation of final polymer composition product and evaluation thereof A finely divided powder of the graft copolymer (G-1) and beads of methacrylic resin moulding material type I (methyl methacrylate (99%)/methyl acrylate (1%) copolymer; hereinafter referred to as "resin type I" for brevity) were blended with each other at the proportions shown in Table I. The blend was kneaded and extruded into pellets through an extruder of P-40-2-6AB-V type (made by Japan Steel Works, outer diameter, 40 mm; L/D = 26) at the cylinder temperature of 200°–260° C and the die temperature of 250° C.

Table I

| Specimen No. | Amount of graft copolymer (G-1) | Amount of resin type I | Content of elastomer |
|---|---|---|---|
| 1-1 | 25.0% | 75.0% | 20.0% |
| 1-2 | 31.25% | 68.75% | 25.0% |
| 1-3 | 37.5% | 62.5% | 30.0% |

The pellets, so obtained, were subjected to press molding at a temperature of 210° C and a pressure of 150 to 200 kg/cm$^2$ to produce almost colorless and highly transparent plates each having a thickness of 6 mm. Table II shows properties of the plates, including a plate made from only resin type I.

Table II

| Specimen No. | *1 Tensile strength (kg/cm$^2$) | *2 Elongation (%) | Impact *3 resistance (notched, Izod) (kg·cm/cm$^2$) | Total *4 luminous transmittance (23° C)(%) | Haze (%) *5 | | |
|---|---|---|---|---|---|---|---|
| | | | | | 23° C | 5° C | 45° C |
| 1-1 | 523 | 5.2 | 2.2 | 92.2 | 1.5 | 1.8 | 2.0 |
| 1-2 | 477 | 7.3 | 3.8 | 91.9 | 1.7 | 2.0 | 2.1 |
| 1-3 | 408 | 9.4 | 3.6 | 91.4 | 1.9 | 2.1 | 2.2 |
| Resin type I (control) | 564 | 3.8 | 1.4 | 92.5 | 1.0 | 1.0 | 1.0 |

Note:
*1 According to ASTM D638-5 6T
*2 According to ASTM D638-56T
*3 to ASTM D256-56T
*4 According to ASTM D1003-59T-A
*5 According to ASTM D1003-59T-A Further, the pellets were subjected to injection molding by using a screw type injection molding machine (V-17-65 type, made by Japan Steel Works) at the cylinder temperature of approximately 260° C, the injection pressure of 900 kg/cm$^2$ and the mold temperature of 50° C, thereby to produce plates of a 2 mm thickness. Specimens of a 110 by 110 mm prepared therefrom were tested. Results are shown in Table III.

Table III

| Specimen No. | Tensile strength (kg/cm$^2$) | Elongation (%) | Impact *1 resistance (Dynstat) (kg·cm/cm$^2$) | Total luminous transmittance (%)(23° C) | Haze (%) | | |
|---|---|---|---|---|---|---|---|
| | | | | | 23° C | 5° C | 45° C |
| 1-1 | 526 | 6.3 | 8.3 | 91.3 | 1.5 | 1.8 | 2.0 |
| 1-2 | 472 | 13.6 | 14.1 | 91.1 | 1.7 | 2.0 | 2.1 |
| 1-3 | 423 | 22.5 | 22.7 | 90.8 | 1.8 | 2.0 | 2.2 |
| Resin type I | 587 | 4.2 | 3.3 | 92.0 | 1.0 | 1.0 | 1.0 |

Table III-continued

| Specimen No. | Tensile strength (kg/cm²) | Elongation (%) | Impact *1 resistance (Dynstat) (kg·cm/cm²) | Total luminous transmittance (%)(23° C) | Haze (%) 23° C | Haze (%) 5° C | Haze (%) 45° C |
| --- | --- | --- | --- | --- | --- | --- | --- |
| (control) | | | | | | | |

Note:
*1 According to BS-1330

Comparative Example 1

The procedures set forth in Stages A, B and C of Example 1, above, were repeated wherein the graft copolymer was prepared without the use of allyl methacrylate with all other conditions substantially remaining the same, whereby pellets of three polymer compositions (1-a, 1-b and 1-c) containing 20%, 25% and 30% of an elastomer, respectively, were produced. The pellets were subjected to injection molding in the same manner as that of Example 1 to produce plates of a 2 mm thickness. These plates had an appearance like frosted glass and properties shown in Table IV.

Table IV

| Specimen No. | Content of elastomer (%) | Tensile strength (kg/cm²) | Elongation (%) | Impact strength (Dynstat) (kg·cm/cm²) | Total luminous transmittance (%) 23° C | Haze (%) 23° C |
| --- | --- | --- | --- | --- | --- | --- |
| 1-a | 20 | 334 | 3.8 | 4.0 | 78.8 | 11.2 |
| 1-b | 25 | 316 | 4.4 | 5.6 | 74.7 | 13.3 |
| 1-c | 30 | 297 | 4.7 | 6.2 | 71.9 | 15.8 |

As is apparent from Table IV, in the case where an elastomer component has no crosslinked structure, the shaped articles are inferior to those of the invention in all the properties, particularly in haze.

EXAMPLES 2 – 7

Stage A: Preparation of crosslinked elastomers (E-2 – E-7)

The procedure set forth in Stage A of Example 1 was repeated wherein the monomer mixtures shown in Table V and the conditions listed below were employed with all other conditions substantially remaining the same.

Table V

| Example No. | Benzyl acrylate | n-butyl acrylate | Allyl methacrylate | Allyl acrylate |
| --- | --- | --- | --- | --- |
| 2* | 20 | 80 | 1.0 | — |
| 3 | 30 | 70 | 1.0 | — |
| 4 | 30 | 70 | — | 1.0 |
| 5 | 35 | 65 | 1.0 | — |
| 6* | 40 | 60 | 1.0 | — |
| 7* | 45 | 55 | 1.0 | — |

*control

Conditions employed:
Ratio of monomer/deionized water = 1/3
Compounds employed other than monomers (parts based on 100 parts of the monomer):

| | |
| --- | --- |
| AEROSOL-OT (Emulsifier) | 2 |
| Potassium persulfate (Initiator) | 0.3 |
| Disodium hydrogenphosphate (Na₂HPO₄·12H₂O) | 0.5 |
| Sodium dihydrogenphosphate (NaH₂PO₄·2H₂O) | 0.3 |
| Polymerization temperature | 50° C |
| Polymerization time | 4 hours |

Properties of the resultant crosslinked elastomers are shown in Table VI.

Table VI

| Ex. No. | Elastomer No. | Degree of swelling | Gel content (%) | Absorbance | Average particle size (micron) |
| --- | --- | --- | --- | --- | --- |
| 2 | E-2 | 9.9 | 91.6 | 0.09 | 0.11 |
| 3 | E-3 | 9.3 | 93.2 | 0.09 | 0.11 |
| 4 | E-4 | 7.8 | 92.8 | 0.11 | 0.12 |
| 5 | E-5 | 9.2 | 92.4 | 0.08 | 0.10 |
| 6 | E-6 | 8.8 | 91.7 | 0.08 | 0.10 |
| 7 | E-7 | 9.1 | 90.9 | 0.09 | 0.11 |

Stage B: Preparation of graft copolymers (G-2 – G-7)

Using the crosslinked elastomers (E-2 – E-7), graft copolymers (G-2 – G-7) were prepared in the same manner as that in Stage B of Example 1. Properties of the resultant graft copolymers are shown in Table VII.

Table VII

| Example No. | Graft copolymer No. | Graft proportion (%) | Grafting efficiency (%) |
| --- | --- | --- | --- |
| 2 | G-2 | 8.1 | 32.4 |
| 3 | G-3 | 9.3 | 38.2 |
| 4 | G-4 | 8.5 | 34.0 |
| 5 | G-5 | 8.1 | 32.4 |
| 6 | G-6 | 8.3 | 33.2 |
| 7 | G-7 | 8.7 | 34.8 |

Stage C: Preparation of final polymer composition products (C-2 – C-7) and evaluation thereof Using the graft copolymers (G-2 – G-7), pellets of polymer compositions (C-2 – C-7) each containing 25% of the crosslinked elastomer were produced in the same manner as that in Stage C of Example 1. Plates of a 2 mm thickness were produced by injection molding from the pellets, and tested. Results are shown in Table VIII.

Table VIII

| Example No. | Polymer composition No. | Impact strength (Dynstat) (kg.cm/cm²) | Total luminous transmittance (%) 23° C | Haze (%) 23° C | Haze (%) 5° C | Haze (%) 45° C |
| --- | --- | --- | --- | --- | --- | --- |
| 2* | C-2 | 13.8 | 88.3 | 5.5 | 5.9 | 6.1 |
| 3 | C-3 | 14.5 | 91.3 | 1.5 | 1.8 | 2.0 |
| 4 | C-4 | 12.9 | 90.9 | 1.7 | 2.1 | 2.2 |
| 5 | C-5 | 11.2 | 90.1 | 2.3 | 2.4 | 2.5 |
| 6* | C-6 | 10.8 | 87.5 | 5.8 | 6.2 | 6.5 |
| 7* | C-7 | 10.3 | 82.6 | 9.4 | 9.7 | 10.0 |

*control

EXAMPLE 8

Stage A: Preparation of crosslinked elastomer (E-8)

After the following aqueous phase was charged into a reactor and flushed with nitrogen, the following monomer phase was continuously added to the aqueous phase over a period of 2 hours, while being stirred at a temperature of 70° C. After the completion of the addition, the reaction mixture was stirred for 1 hour further to proceed the polymerization, whereby a latex of an elastomer (E-8) was obtained.

| Monomer phase: | Parts |
| --- | --- |
| Benzyl acrylate | 25 |
| n-butyl acrylate | 74 |
| Allyl methacrylate | 1.0 |
| AEROSOL-OT | 2.0 |
| Aqueous phase: | |
| Deionized water | 300 |
| Potassium persulfate | 0.3 |
| Disodium hydrogenphosphate ($Na_2HPO_4.12H_2O$) | 0.5 |
| Sodium dihydrogenphosphate ($NaH_2PO_4.2H_2O$) | 0.3 |

When a part of the latex was diluted with water to a concentration of 0.5 g/l, the resultant latex exhibited an absorbance of 0.39 at a wave length of 700 m micron.

The elastomer (E-8) was found to possess an average particle size of 0.21 micron. The elastomer (E-8) had a degree of swelling 9.2 and a gel content of 92.6%.

Stage B: Preparation of graft copolymers (G-8-1 – G-8-4)

Using the elastomer (E-8), graft copolymers were produced in the same manner as that in Stage B of Example 1 except that monomer mixtures shown in Table IX were used.

Table IX

Compositions of monomer and elastomer mixtures charged for graft copolymerization (parts)

| Composition | Graft copolymer No. | | | |
| --- | --- | --- | --- | --- |
| | G-8-1 | G-8-2 | G-8-3 | G-8-4 |
| Elastomer (E-8) latex | 400 | 400 | 400 | 400 |
| Methyl methacrylate | 30.0 | 29.0 | 27.0 | 25.0 |
| Methyl acrylate | — | 1.0 | 3.0 | 5.0 |
| n-octyl mercaptan | 0.03 | 0.03 | 0.03 | 0.03 |
| p-menthane hydroperoxide | 0.15 | 0.15 | 0.15 | 0.15 |
| RONGALIT* | 0.15 | 0.15 | 0.15 | 0.15 |
| Deionized water | 3.0 | 3.0 | 3.0 | 3.0 |

Note:
*Trade name for formaldehyde sodium sulfoxylate, made by WAKO JUNYAKU K. K., Japan Properties of the resultant graft copolymers are shown in Table X.

Table X

| Graft copolymer No. | Graft proportion (%) | Grafting efficiency (%) |
| --- | --- | --- |
| G-8-1 | 7.2 | 28.8 |
| G-8-2 | 8.2 | 32.8 |
| G-8-3 | 8.7 | 34.8 |
| G-8-4 | 8.9 | 35.6 |

Stage C: Preparation of final polymer composition products (C-8-1 – C-8-4) and evaluation therof using the graft copolymers (G8-1 – G-8-4) and resin type I or methacrylic resin moulding material type II (methyl methacrylate (90%)/methyl acrylate (10%) copolymer; herein-after referred to as "resin type II" for brevity), pellets of polymer composition products (C-8-1 – C-8-4) each containing 25% of the crosslinked elastomer were produced by using a screw type extruder.

Table XI

| Composition Polymer composition No. | Graft copolymer No. | Graft copolymer Proportion (%) | Resin type Designation | Resin type Proportion (%) |
| --- | --- | --- | --- | --- |
| C-8-1 | G-8-1 | 32.5 | I | 67.5 |
| C-8-2 | G-8-2 | 32.5 | I | 67.5 |
| C-8-3 | G-8-3 | 32.5 | II | 67.5 |
| C-8-4 | G-8-4 | 32.5 | II | 67.5 |

Plate specimens of a 110 × 110 × 2 mm size were prepared by using a screw type injection molding machine, and tested. Results are shown in Table XII.

Table XII

| Polymer composition No. | Impact strength (Dynstat) (kg.cm/cm²) | Total luminous transmittance (%) 23° C | Haze (%) 23° C | Haze (%) 5° C | Haze (%) 45° C |
| --- | --- | --- | --- | --- | --- |
| C-8-1 | 11.2 | 91.7 | 1.3 | 1.5 | 1.8 |
| C-8-2 | 12.2 | 90.8 | 1.9 | 2.1 | 2.3 |
| C-8-3 | 10.8 | 91.5 | 1.4 | 1.6 | 1.9 |

Table XII-continued

| Polymer composition No. | Impact strength (Dynstat) (kg.cm/cm$^2$) | Total luminous transmittance (%) 23° C | Haze (%) 23° C | Haze (%) 5° C | Haze (%) 45° C |
|---|---|---|---|---|---|
| C-8-4 | 11.9 | 91.3 | 1.7 | 2.0 | 2.1 |

EXAMPLE 9

Using the pellets obtained in Stage C of Example 8, films of an 80 micron thickness were propared by an inflation process at the die temperature of 230° C, and tested. Results are shown in Table XIII.

Table XIII

| Polymer composition No. | Tensile[1] strength (kg/cm$^2$) | Elongation[1] (%) | Impact[2] resistance (g) | Haze[3] (%) 23° C |
|---|---|---|---|---|
| C-8-1 | 310 | 75 | 350 | 1.3 |
| C-8-2 | 293 | 110 | 340 | 1.5 |
| C-8-3 | 286 | 90 | 340 | 1.5 |
| C-8-4 | 275 | 115 | 330 | 1.4 |

Note:
[1]According to JIS Z170-2
[2]According to ASTM D1709-62T (Free falling dart method)
[3]According to ASTM D1003-61

When these films were subjected to weathering test by using a CW-DV2 type weather tester manufactured by Shimazu Seisakusho, Japan, with the exposure over a period of 1,000 hours, all these films exhibited both retentions in tensile strength and elongation of higher than 90%.

Comparative Example 2

The procedure described in Stage A of Example 8 was repated wherein the monomer phase was continously added to the aqueous phase over a period of 5 hours in substitution for 2 hours with all other conditions substantially remaining the same. The crosslinked elastomer, so obtained, had an average particle size of 0.28 micron, a degree of swelling 11.3 and a gel content of 91.2%.

Using the crosslinked elastomer, a graft copolymer was prepared from the following monomer composition in the same manner as that in Stage B of Example 1.

| Monomer composition (parts based on 100 parts of the crosslinked elastomer): | |
|---|---|
| Methyl methacrylate | 24 |
| Methyl acrylate | 1 |
| n-octyl mercaptan | 0.025 |
| p-menthane hydroperoxide | 0.125 |
| RONGALIT | 0.125 |

Blending the graft copolymer with resin type I, pellets containing 25% of the crosslinked elastomer were prepared in the same manner as that in Stage C of Example 8. A plate specimen of a 2 mm thickness was prepared from the pellets by using a screw type injection molding machine, and tested. The specimen had a tensile strength of 475 kg/cm$^2$, and elongation of 8.9% and an impact strength (Dynstat) of 12.8 kg.cm/cm$^2$, as well as a total luminous transmittance of 85.1% and a haze of 8.7%, both at 23° C.

It will be clearly understood that, when the crosslinked elastomer has a particle size exceeding 0.25 micron, it results in shaped articles having a reduced total luminous transmittance, an increased haze and hence a deteriorated appearance, although the shaped articles are not inferior in mechanical properties including impact resistance, as compared with those of the invention.

Comparative Example 3

The procedure of Stage A in Example 1 as repeated wherein 1.0 part of ethyleneglycol dimethacrylate was used in substitution for 1.0 part of allyl methacrylate with all other conditions remaining the same, whereby a crosslinked elastomer possessing a degree of swelling 23.3, a gel content of 72.4% and an average particle size of 0.12 micron was obtained. Using the crosslinked elastomer, the graft copolymerization and the blending of the graft copolymer with resin type I were carried out in the same manner as those in Stages B and C of Example 1, to produce pellets of a polymer composition containing 25% of the crosslinked elastomer.

A plate specimen prepared from the pellets by injection molding exhibited a tensile strength of 433 kg/cm$^2$, an elongation of 5.3% and an impact strength (Dynstat) of 7.8 kg.cm/cm$^2$, as well as a total luminous transmittance of 81.2% and a haze of 12.2%, both at 23° C.

It will be apparent from the above results that, when ethyleneglycol dimethacrylate is used as a crosslinking agent instead of allyl methacrylate, a shaped article having a considerably reduced total luminous transmittance results.

Comparative Example 4

The procedure of Stage A in Example 1 was reported wherein 1.0 part of triallyl cyanurate was used in substitution for 1.0 part of allyl methacrylate with all other conditions remaining the same, whereby a crosslinked elastomer prossessing a degree of swelling 26.7, a gel content of 83.5% and an average particle size of 0.11 micron. From the crosslinked elastomer, pellets of a polymer composition containing 25% of the crosslinked elastomer was produced in the same manner as those of Stages B and C in Example 1. A plate specimen prepared from the pellets exhibited a tensile strength of 425 kg/cm$^2$, an elongation of 5.4% and an impact strength (Dynstat) of 9.1 kg.cm/cm$^2$, as well as a total luminous transmittance of 78.3% and a haze of 12.8%, both at 23° C.

EXAMPLE 10

Using the crosslinked elastomer (E-1) latex having a solid content of 25% which was obtained in Stage A of Example 1, a graft copolymer containing 25% of the crosslinked elastomer was produced in the same manner as that in Stage B of Example 1, except that the following composition was employed and a monomer phase consisting of methyl methacrylate, n-octyl, mercaptan and p-menthane hydroperoxide was added over a period of 3 hours.

| | Parts |
|---|---|
| Elastomer (E-1) latex (solid content, 25%) | 400 |
| Methyl methacrylate | 300 |
| n-octyl mercaptan | 0.75 |
| p-menthane hydroperoxide | 1.5 |
| RONGALIT | 1.5 |
| Deionized water | 8.5 |

The graft copolymer containing 25% of the cross-linked elastomer, so obtained, exhibited a graft proportion of 41.4% and a grafting efficiency of 13.8%.

A finely divided powder of the graft copolymer was kneaded and extruded into pellets through a screw type extruder at a cylinder temperature of 200° to 260° C. The pellets were subjected to injection molding to form a plate of a 2 mm thickness. A specimen of a 110 by 110 mm prepared therefrom exhibited a tensile strength of 481 kg/cm², an elongation of 11.6%, an impact strength (Dynstat) of 14.2 kg.cm/cm² and a total luminous transmittance of 91.7% at 23° C. The haze was 1.9% at 5° C, 1.6% at 23° C and 2.1% at 50° C.

EXAMPLES 11 – 15

Stage A: Preparation of crosslinked elastomers (E-11 – E-15)

Monomer mixtures listed in Table XIV were polymerized by emulsion polymerization in the same manner as that in Stage A of Example 1 to prepare cross-linked elastomer latexes each having a solid content of 25%. Properties of the cross-linked elastomer are shown in Table XV.

Table XIV

| Example No. | Monomer composition (parts) | | |
|---|---|---|---|
| | Benzyl acrylate | n-butyl acrylate | Allyl methacrylate |
| 11 | 30 | 70 | 0.3 |
| 12 | 30 | 70 | 0.5 |
| 13 | 29.4 | 68.6 | 2.0 |
| 14 | 28.5 | 66.5 | 5.0 |
| 15 | 27.9 | 65.1 | 7.0 |

Note:
The ratio of (benzyl) acrylate/n-butyl acrylate) was substantially constant all over the Examples.

Table XV

| Ex. No. | Elastomer No. | Degree of swelling | Gel content (%) | Absorbance | Average particle size (micron) |
|---|---|---|---|---|---|
| 11 | E-11 | 23.1 | 78.3 | 0.09 | 0.11 |
| 12 | E-12 | 17.6 | 82.4 | 0.09 | 0.11 |
| 13 | E-13 | 7.3 | 94.1 | 0.10 | 0.11 |
| 14 | E-14 | 5.6 | 95.2 | 0.08 | 0.11 |
| 15 | E-15 | 2.8 | 96.5 | 0.08 | 0.11 |

Stage B: Preparation of graft copolymers (G-11 – G-15)

Using the crosslinked elastomers (E-11 – E-15), graft copolymers (G-11 – G-15) were prepared in the same manner as that in Stage B of Example 1. Properties of the graft copolymers were as shown in Table XVI.

Table XVI

| Example No. | Graft copolymer No. | Graft proportion (%) | Grafting efficiency (%) |
|---|---|---|---|
| 11 | G-11 | 5.3 | 21.2 |
| 12 | G-12 | 7.6 | 30.4 |
| 13 | G-13 | 8.5 | 34.0 |
| 14 | G-14 | 9.2 | 36.8 |
| 15 | G-15 | 9.4 | 37.6 |

Stage C: Preparation of polymer composition products (C-11 – C-15) and evaluation thereof Using the graft copolymers (G-11 – G-15) and resin type I, pellets of polymer compositions (C-11 – C-15), each containing 25% of the crosslinked elastomer, were prepared in the same manner as that in stage C of Example 1. Text results of plate specimens, each having a 110 × 110 × 2 mm size, prepared from the pellets are shown in Table XVII.

Table XVII

| Example No. | Polymer composition No. | Impact resistance (Dynstat) (kg · cm/cm²) | Total luminous transmittance (%) 23° C | Haze (%) | | |
|---|---|---|---|---|---|---|
| | | | | 23° C | 5° C | 45° C |
| 11 | C-11 | 11.3 | 88.3 | 6.4 | 6.8 | 7.0 |
| 12 | C-12 | 16.7 | 89.8 | 4.1 | 4.4 | 4.6 |
| 13 | C-13 | 10.9 | 91.3 | 1.8 | 2.0 | 2.2 |
| 14 | C-14 | 8.8 | 91.5 | 1.5 | 1.8 | 2.0 |
| 15 | C-15 | 6.4 | 91.6 | 1.3 | 1.7 | 1.8 |

Comparative Example 5

All the procedures of Example I were repeated wherein a monomer mixture consisting of 99 parts n-butyl acrylate and 1.0 part allyl methacrylate was used in substitution for the monomer mixture consisting of 73 parts n-butyl acrylate, 26 parts benzyl acrylate and 1.0 part allyl methacrylate used in Stage A of Example 1 with all other conditions substantially remaining the same, whereby a polymer composition containing 25% of a crosslinked elastomer was produced. A plate specimen of a 110 × 110 × 2 mm size prepared from the polymer composition exhibited an impact strength (Dynstat) of 12.2 kg.cm/cm², and a total luminous transmittance of 78.3% and a haze of 17.4%, both at 23° C.

Comparative Examples 6 – 10

Emulsion polymerization for crosslinked elastomers (EC-6 – EC-10), graft copolymerization for graft copolymers (GC-6 – GC-10) and blending of the graft copolymers with resin type I were performed in order in the same manner as those in Example 1, except that monomer mixtures listed in Table XVIII were used in the emulsion polymerization for the crosslinked elastomers in substitution for the monomer mixture consisting of n-butyl acrylate, benzyl acrylate and allyl methacrylate, whereby pellets of polymer compositions (CC-6 – CC-10) each containing 25% of the crosslinked elastomer were produced. Properties of the crosslinked elastomers (EC-6 – EC-10) and the graft copolymers (GC-6 – GC-10), and plate specimens of the polymer compositions (CC-6 – CC-10) were as shown in Tables XIX, XX and XXI, respectively.

Table XVIII

| Comparative Example No. | Monomer composition (parts) | | |
|---|---|---|---|
| | Styrene | n-butyl acrylate | Allyl methacrylate |
| 6 | 15 | 84 | 1.0 |
| 7 | 20 | 79 | 1.0 |
| 8 | 25 | 74 | 1.0 |
| 9 | 30 | 69 | 1.0 |
| 10 | 35 | 64 | 1.0 |

Table XIX

| Comparative Example No. | Elastomer No. | Degree of swelling | Gel content (%) | Absorbance | Average particle size (micron) |
|---|---|---|---|---|---|
| 6 | EC-6 | 9.6 | 92.3 | 0.10 | 0.11 |
| 7 | EC-7 | 8.8 | 92.2 | 0.09 | 0.11 |
| 8 | EC-8 | 8.3 | 91.7 | 0.08 | 0.11 |
| 9 | EC-9 | 7.9 | 92.6 | 0.09 | 0.11 |
| 10 | EC-10 | 8.2 | 91.3 | 0.09 | 0.11 |

Table XX

| Comparative Example No. | Graft copolymer No. | Graft proportion (%) | Grafting efficiency (%) |
|---|---|---|---|
| 6 | GC-6 | 8.3 | 33.2 |
| 7 | GC-7 | 8.6 | 34.4 |
| 8 | GC-8 | 7.9 | 31.6 |
| 9 | GC-9 | 7.4 | 29.6 |
| 10 | GC-10 | 7.6 | 30.4 |

Table XXI

| Comparative Example No. | Polymer composition No. | Tensile strength (kg/cm$^2$) | Elongation (%) | Impact strength (Dynstat) (kg·cm/cm$^2$) | Total luminous transmittance (%) 23° C | Haze (%) | | |
|---|---|---|---|---|---|---|---|---|
| | | | | | | 23° C | 5° C | 45° C |
| 6 | CC-6 | 485 | 10.3 | 15.3 | 88.8 | 5.4 | 7.8 | 9.1 |
| 7 | CC-7 | 476 | 11.7 | 15.0 | 91.6 | 1.3 | 2.4 | 3.2 |
| 8 | CC-8 | 494 | 10.9 | 14.2 | 91.4 | 1.4 | 2.6 | 3.5 |
| 9 | CC-9 | 483 | 9.8 | 12.6 | 89.5 | 4.2 | 6.3 | 7.5 |
| 10 | CC-10 | 477 | 9.2 | 9.1 | 87.3 | 6.7 | 8.2 | 10.5 |

EXAMPLES 16 – 18

The procedures in Stages A and B of Example 1 were repeated wherein monomer mixtures used for the preparation of crosslinked elastomers (E-16 – E-18) and graft copolymers (G-16 – G-18) were as listed in Table XXII. In the stage for graft copolymerization, a mixture of methyl methacrylate, p-menthane hydroperoxide and n-octyl mercaptan was incorporated into a latex of the crosslinked elastomer one at a time in Example 16, and in a continuous manner over a period of 1 hour in Example 17, and 3 hours in Example 18.

Table XXII

| Example No. | Monomer composition for crosslinked elastomer (parts) | | | | Monomer composition for graft copolymerization (parts) | | | | |
|---|---|---|---|---|---|---|---|---|---|
| | BA | BZA | ST | AMA | MMA | PMH | RO | n-OM | Water |
| 16 | 70 | 29 | — | 1.0 | 5 | 0.05 | 0.10 | 0.005 | — |
| 17 | 70 | 29 | — | 1.0 | 50 | 0.25 | 0.25 | 0.05 | — |
| 18 | 70 | 29 | — | 1.0 | 300 | 1.50 | 1.50 | 0.75 | 500 |

Note:
BA n-butyl acrylate
BZA Benzyl acrylate
ST Styrene
AMA Allyl methacrylate
MMA Methyl methacrylate
PMH p-menthane hydroperoxide (as a 50% solution)
n-OM n-octyl mercaptan Properties of the crosslinked elastomers (E-16 – E-18) and the graft copolymers (G-16 – G-18) were as shown in Table XXIII.

Table XXIII

| Example No. | Crosslinked elastomer | | | | Graft copolymer | | |
|---|---|---|---|---|---|---|---|
| | No. | Average particle size (micron) | Degree of swelling (%) | Gel content (%) | No. | Graft proportion (%) | Grafting efficiency (%) |
| 16 | E-16 | 0.11 | 9.1 | 92.3 | G-16 | — | — |
| 17 | E-17 | 0.11 | 8.2 | 93.1 | G-17 | 15.2 | 30.4 |
| 18 | E-18 | 0.10 | 8.8 | 92.7 | G-18 | 47.1 | 15.7 |

The graft copolymer (G-18) was extruded alone and other graft copolymers were extruded together with resin type I, to produce pellets of polymer compositions (C-16 – C-18) all containing 25% of the crosslinked elastomers.

Test results of plate specimens prepared from the pellets are shown in Table XXIV.

Table XXIV

| Example No. | Polymer composition No. | Tensile strength (kg/cm$^2$) | Elongation (%) | Impact strength (Dynstat) (kg·cm/cm$^2$) | Total luminous transmittance (%) 23° C | Haze (%) | | |
|---|---|---|---|---|---|---|---|---|
| | | | | | | 23° C | 5° C | 45° C |
| 16 | C-16 | 384 | 5.2 | 6.8 | 89.7 | 3.5 | 3.9 | 4.3 |
| 17 | C-17 | 477 | 13.5 | 15.1 | 91.8 | 1.6 | 1.9 | 2.0 |

Table XXIV-continued

| Example No. | Polymer composition No. | Tensile strength (kg/cm²) | Elongation (%) | Impact strength (Dynstat) (kg · cm/cm²) | Total luminous transmittance (%) 23° C | Haze (%) 23° C | 5° C | 45° C |
|---|---|---|---|---|---|---|---|---|
| 18 | C-18 | 485 | 14.3 | 14.6 | 91.8 | 1.6 | 1.8 | 1.9 |

EXAMPLES 19 – 21 AND COMPARATIVE EXAMPLES 11 – 13

Stage A: Preparation of crosslinked elastomers (E-19 – E-21) and (EC-11 – EC-13)

The procedures set forth in Stage A of Example 1 were repeated wherein monomer mixtures listed in Table XXV were used, with all other conditions substantially remaining the same, to produce crosslinked elastomers (E-19 – 21 and EC-11 – 13). Properties of the crosslinked elastomers are shown in Table XXVI.

Table XXV

| Example No. | Monomer composition (parts) | | | |
|---|---|---|---|---|
| | n-butyl acrylate | Benzyl acrylate | Styrene | Allyl methacrylate |
| 19 | 74.7 | 25 | — | 0.3 |
| 20 | 74.5 | 25 | — | 0.5 |
| 21 | 74.0 | 25 | — | 1.0 |
| 11* | 79.7 | — | 20 | 0.3 |
| 12* | 79.5 | — | 20 | 0.5 |
| 13* | 79.0 | — | 20 | 1.0 |

*Comparative Example

Table XXVI

| Example No. | Elastomer No. | Degree of swelling (%) | Gel content (%) |
|---|---|---|---|
| 19 | E-19 | 24.2 | 79.1 |
| 20 | E-20 | 16.4 | 85.7 |
| 21 | E-21 | 9.3 | 92.8 |
| 11* | EC-11 | 27.8 | 74.6 |
| 12* | EC-12 | 20.3 | 81.5 |
| 13* | EC-13 | 9.7 | 90.9 |

*Comparative Example

Stage B: Crosslinking with peroxide

To 400 parts of the crosslinked elastomer (E-19-21 and EC-11-13) latexes, each having a solid content of 25% (i.e. 100 parts of the crosslinked elastomer), there was added a blend consisting of 10 parts of a monomer mixture possessing the same composition as those of the crosslinked elastomers, but not containing allyl methacrylate, and 1 part of t-butyl peroxy-2-ethylhexanoate. The resultant mixture was heated at a temperature of 90° C for 3 hours to perform peroxide crosslinking.

The elastomers (E'-19 – E'C-13) crosslinked with peroxide, so prepared, had the properties shown in Table XXVII.

Table XXVII

| Example No. | Elastomer No. | Degree of swelling (%) | Gel content (%) |
|---|---|---|---|
| 19 | E'-19 | 18.3 | 88.6 |
| 20 | E'-20 | 10.4 | 92.5 |
| 21 | E'-21 | 7.7 | 95.8 |
| 11* | E'C-11 | 18.6 | 89.2 |
| 12* | E'C-12 | 9.8 | 93.5 |
| 13* | E'C-13 | 7.2 | 94.7 |

*Comparative Example

Stage C: Preparation of graft copolymers (G-19 – G-21) and (GC-11 – GC-13)

The procedure set forth in Stage B of Example 1 was repeated wherein 373 parts of the crosslinked elastomer (E'-19 – E'-13) latexes each having a solid content of 26.5% (i.e. 100 parts of the crosslinked elastomers) were used in substitution for the crosslinked elastomer (E-1), with all other conditions remaining the same, to produce graft copolymers (G-19 –10 21 and GC-11 – 13). Properties of the graft copolymers are shown in Table XXVII.

Table XXVIII

| Example No. | Graft copolymer No. | Graft proportion (%) | Grafting efficiency (%) |
|---|---|---|---|
| 19 | G-19 | 4.9 | 19.6 |
| 20 | G-20 | 7.4 | 30.6 |
| 21 | G-21 | 8.2 | 32.8 |
| 11* | GC-11 | 5.1 | 20.4 |
| 12* | GC-12 | 6.7 | 26.8 |
| 13* | GC-13 | 8.8 | 35.2 |

*Comparative Example

Stage D: Preparation of polymer compositions (C-19 – C-21) and (CC-11 – CC-13) and evaluation thereof Using the graft copolymers (G-19 – 21 and GC-11 – 13) and resin type I, pellets of polymer compositions (C-19 – 21 and CC-11 – 13), each containing 25% of the crosslinked elastomer, were produced in the same manner as that in Stage C of Example 1. Plate specimens prepared by injection molding from these pellets had properties as shown in Table XXIX.

Table XXIX

| Example No. | Polymer composition No. | Impact strength (Dynstat) (kg · cm/cm²) | Total luminous transmittance (%) 23° C | Haze (%) 23° C | 5° C | 45° C |
|---|---|---|---|---|---|---|
| 19 | C-19 | 13.7 | 90.2 | 2.4 | 2.6 | 2.8 |
| 20 | C-20 | 12.8 | 91.0 | 1.9 | 2.1 | 2.3 |
| 21 | C-21 | 14.6 | 91.4 | 1.5 | 1.8 | 2.0 |
| 11* | CC-11 | 12.2 | 90.4 | 2.3 | 4.0 | 4.8 |
| 12* | CC-12 | 13.6 | 90.8 | 2.1 | 3.6 | 4.4 |

Table XXIX-continued

| Example No. | Polymer composition No. | Impact strength (Dynstat) (kg · cm/cm²) | Total luminous transmittance (%) 23° C | Haze (%) 23° C | Haze (%) 5° C | Haze (%) 45° C |
| --- | --- | --- | --- | --- | --- | --- |
| 13* | CC-13 | 13.8 | 91.2 | 1.7 | 3.1 | 4.0 |

*Comparative Example

What we claim is:

1. A polymer composition consisting essentially, by weight, of:
   A. 95 to 50% of a polymer consisting essentially, by weight, of 100 to 80% methyl methacrylate and 0 to 20% of at least one copolymerizable vinyl and/or vinylidene monomer, at least 10 parts by weight of said polymer (A), based on 100 parts by weight of the crosslinked elastomer in (B) below, being those obtained by polymerization in the presence of the crosslinked elastomer in (B) below; and
   B. 5 to 50% of a crosslinked elastomer obtained by copolymerizing by aqueous emulsion polymerization a monomer mixture consisting essentially of:
      I. at least one alkyl acrylate containing from 2 to 8 carbon atoms in the alkyl moiety,
      II. allyl acrylate and/or allyl methacrylate, and
      III. benzyl acrylate, said crosslinked elastomer being substantially spherical in shape and having an average particle size of 0.05 to 0.25 micron, a degree of swelling 3 to 20 and a gel content of not less than 80%; and the amounts of the three components (I), (II) and (III) contained in the crosslinked elastomer (B) being such that component (II) is present in an amount of 0.5 to 5 parts based on 100 parts of component (I) and the ratio of {component (I) + component (II)}/component (III) is from 75/25 to 65/35, all by weight.

2. A polymer composition according to claim 1 wherein said polymer composition is a graft copolymer composition obtained by polymerizing 100 to 1900 parts by weight of a monomer mixture consisting essentially, by weight, of 100 to 80% methyl methacrylate and 0 to 20% of at least one copolymerizable vinyl and/or vinylidene monomer, in the presence of 100 parts by weight of said crosslinked elastomer (B).

3. A polymer composition according to claim 1 wherein said polymer composition is a blend of a polymer (C) consisting essentially, by weight, of 100 to 80% methyl methacrylate and 0 to 20% of at least one copolymerizable vinyl and/or vinylidene monomer with a graft copolymer composition obtained by polymerizing not less than 10 but less than 1900 parts by weight of a monomer mixture consisting essentially, by weight, of 100 to 80% methyl methacrylate and 0 to 20% of at least one copolymerizable vinyl and/or vinylidene monomer, in the presence of 100 parts by weight of said crosslinked elastomer (B).

4. A polymer composition according to claim 1 wherein said crosslinked elastomer is obtained by copolymerizing by aqueous emulsion polymerization a monomer mixture consisting essentially of:
   I. at least one alkyl acrylate containing from 2 to 8 carbon atoms in the alkyl miety,
   II. allyl acrylate and/or allyl methacrylate, and
   III. benzyl acrylate and then, treating the resulting polymer with 0.1 to 5% by weight, based on the weight of the resulting crosslinked elastomer, of aliphatic peroxide; said crosslinked elastomer being substantially spherical in shape and having an average particle size of 0.05 to 0.25 micron, a swelling degree of 3 to 20 and a gel content of not less than 80%; and the amounts of the three components (I), (II) and (III) contained in the crosslinked elastomer (B) being such that component (II) is present in an amount of 0.5 to 5 parts based on 100 parts of component (I) and the ratio of {component (I) + component (II)}/component (III) is from 75/25 to 65/35, all by weight.

5. A polymer composition according to claim 1 wherein said alkyl acrylate (I) contained in the crosslinked elastomer (B) is n-butyl acrylate.

6. A polymer composition according to claim 1 wherein said alkyl acrylate (I) contained in the crosslinked elastomer (B) is 2-ethylhexyl acrylate.

7. A graft copolymer composition according to claim 1 wherein said component (II) is allyl acrylate.

8. A graft copolymer composition according to claim 1 wherein said component (II) is allyl methacrylate.

9. A graft copolymer composition obtained by polymerizing 10 to 1900 parts by weight of a monomer mixture consisting essentially, by weight, or 100 to 80% methyl methacrylate and 0 to 20% of at least one copolymerizable vinyl and/or vinylidene monomer, in the presence of 100 parts by weight of a crosslinked elastomer (B) obtained by copolymerizing by aqueous emulsion copolymerization a monomer mixture consisting essentially of:
   I. at least one alkyl acrylate containing from 2 to 8 carbon atoms in the alkyl moiety,
   II. allyl acrylate and/or allyl methacrylate, and
   III. benzyl acrylate said crosslinked elastomer (B) being substantially spherical in shape and having an average particle size of 0.05 to 0.25 micron, a swelling degree of 3 to 20 and a gel content of not less than 80%; and the amounts of the three components (I), (II) and (III) contained in the crosslinked elastomer being such that component (II) is present in an amount of 0.5 to 5 parts based on 100 parts of component (I) and the ratio of {component (I) + component (II) }/component (III) is from 75/25 to 65/35, all by weight.

* * * * *